United States Patent
Sudo

[11] Patent Number: 6,078,170
[45] Date of Patent: Jun. 20, 2000

[54] SWITCHING REGULATOR CONTROL CIRCUIT OF PWM SYSTEM AND SWITCHING REGULATOR THEREOF

[75] Inventor: Minoru Sudo, Chiba, Japan

[73] Assignee: Seiko Instruments Inc., Japan

[21] Appl. No.: 09/251,610

[22] Filed: Feb. 17, 1999

[30] Foreign Application Priority Data

Feb. 18, 1998 [JP] Japan ................................. 10-036183

[51] Int. Cl.[7] ....................................................... G05F 1/40
[52] U.S. Cl. ........................................................... 323/282
[58] Field of Search ................................... 323/282, 283, 323/284, 351

[56] References Cited

U.S. PATENT DOCUMENTS

| | | | |
|---|---|---|---|
| 5,399,958 | 3/1995 | Iyoda | 323/282 |
| 5,543,996 | 8/1996 | Nakago | 361/90 |
| 5,670,866 | 9/1997 | Suzuki et al. | 323/289 |
| 5,680,036 | 10/1997 | Faulk | 323/282 |
| 5,703,473 | 12/1997 | Phillips et al. | 323/282 |
| 5,838,147 | 11/1998 | Suzuki et al. | 323/289 |

*Primary Examiner*—Adolf Deneke Berhane
*Attorney, Agent, or Firm*—Adam & Wilks

[57] ABSTRACT

In order to avoid damage to a switching regulator in the event of short-circuiting of a load, and to reduce power consumption, the maximum duty ratio of a PWM type switching regulator is provided with a supply voltage dependency. A control circuit for a PWM type switching regulator according to a first embodiment comprises an error amplifier for producing an error signal based on a difference between a fed back portion of a regulated output voltage of a PWM type switching regulator and a first reference voltage, a first circuit for producing a pulse output signal having successive pulses the width of which is dependent upon the value of the error signal, such that the value of the regulated output voltage of the PWM type switching regulator is regulated by the first circuit, and a second circuit for producing a second pulse output signal for modulating the first periodic pulse output signal, the second pulse output signal having successive pulses the width of which is dependent upon the value of the second reference voltage so that the maximum duty cycle of the voltage regulator is dependent upon the second reference voltage. The second reference voltage varies depending upon the value of a power supply voltage of the PWM type switching regulator so that the maximum duty ratio is increased when the power supply voltage decreases and the maximum duty ratio decreases when the power supply voltage increases.

9 Claims, 6 Drawing Sheets

SWITCHING REGULATOR CONTROL CIRCUIT OF PWM SYSTEM AND SWITCHING REGULATOR THEREOF

BACKGROUND OF THE INVENTION

The present invention relates to a switching SW regulator control circuit of the PWM type which can supply a large current to a load even with a low-input power supply voltage in accordance with an input power supply voltage of a switching regulator (hereinafter referred to as "SW regulator") and which can prevent from flowing a larger current than required one even in an over-load state such as a load short-circuiting, at the time of a high-input power supply voltage.

As a conventional PFM SW regulator control circuit, there has been known a SW regulator control circuit shown in a circuit diagram of FIG. 5. That is, there is provided an error amplifier 13 that amplifies the differential voltage between the reference voltage Vref of a reference voltage circuit 10 and a voltage of at a node of bleeder resistors 11 and 12 that divide an output voltage Vout of an output terminal 5 of the SW regulator. Assuming that the output voltage of the error amplifier 13 is Verr, the output voltage of the reference voltage circuit 10 is Vref, and the voltage of the node of the bleeder resistors 11 and 12 is Va, if Vref>Va, Verr becomes high, but conversely if Vref<Va, it becomes low.

A first circuit, which is a PWM (pulse width modulation) comparator 15 compares an output Vtri of an oscillator circuit 14, for example, a triangular wave with an output Verr of the error amplifier 13 to output a signal. This is shown in FIG. 6. That is, the pulse width of the output Vpwm of the PWM comparator 15 is controlled by making the output voltage Verr of the error amplifier 13 larger or smaller. During this pulse width period, the switch element used in the SW regulator is on/off-controlled. This is a so-called PWM operation of the SW regulator.

Also, an output Vcomp of a second circuit, which is a comparator 17 that compares a reference voltage value Vref2 of a reference voltage circuit 16 with a triangular wave output voltage value Vtri of the oscillator circuit 14 becomes low in level when Vref2<Vtri. When the output Vcomp of the comparator 17 becomes low in level, its low level output is inputted to an AND gate 18, and an output Vand of the AND gate 18 is always low in level. That is, the maximum duty ratio of the SW regulator (the maximum value of the ratio of a period during which the switching element used in the SW regulator is on to the switching period of the SW regulator; hereinafter referred to as "maximum duty ratio") is determined by setting the reference voltage value Vref2 at a certain level of the triangular wave Vos of the oscillator circuit 14. In general, in case of the SW regulator, if a period during which the switching element used in the SW regulator is on is longer, the capacity for supplying an electric power to a load increases. For example, as the load becomes heavy, that is, as the output load current value becomes large, the output voltage of the SW regulator drops, and the voltage Va divided by the bleeder resistors drops. As a result, since the output voltage Verr of the error amplifier 13 increases with the result that the pulse width of the output Vpwm of the PWM comparator 15 is widened (the duty ratio becomes large), the pulse width is controlled so that the output voltage Vout is held constant.

Conversely, as the load becomes light, that is, as the output load current value becomes small, the output voltage of the SW regulator increases, and the voltage Va divided by the bleeder resistors increases. As a result, since the output voltage Verr of the error amplifier 13 decreases with the result that the pulse width of the output Vpwm of the PWM comparator 15 is narrowed (the duty ratio becomes small), the pulse width is controlled so that the output voltage Vout is held constant.

That is, the output voltage Verr of the error amplifier 13 varies in accordance with the load current value to control the pulse width of the SW regulator.

In general, in case of the SW regulator, an energy stored in a coil used therein depends on the voltage difference between both ends of the coil, that is, an input power supply voltage, and the higher input power supply voltage, the higher the energy stored in the coil. That is, even in a same load, the lower input power supply voltage requires a larger pulse width to turn on the switch element used in the SW regulator, and a higher input power supply voltage turns on the switch element used in the SW regulator by a smaller pulse width.

However, the conventional SW regulators suffer from the following problems. That is, if the maximum duty ratio is made small, when the power supply voltage is low, the coil energy due to the switching operation is small with the result that a large load current cannot be supplied. Also, if the maximum duty ratio is made large, when the power supply voltage is high, even in an abnormal state such as when load short-circuiting occurs, because the coil energy due to switching operation is large, a large current flows in the power supply circuit or the SW element to cause damage thereto.

In view of the above, in order to solve the above problems, an object of the present invention is to provide power supply voltage dependency to the maximum duty ratio of the SW regulator of the PFM system so as to set the maximum duty ratio to be large when the power supply voltage is low, and to set the maximum duty ratio to be small when the power supply voltage is high, so that energy can be sufficiently supplied to a load even at a low power supply voltage, and a power supply current and a switching current (a current flowing in the switch element used in the SW regulator) are suppressed, even when abnormality such as load short-circuiting occurs, when the power supply voltage is high.

SUMMARY OF THE INVENTION

In order to solve the above problems, according to the present invention, there is provided a SW regulator control circuit in which power supply voltage dependency is imported to the maximum duty ratio, thereby, without losing energy supply capacity to a load when the power supply voltage is low, suppressing the power supply current and the switching current even when abnormality occurs in a load when the power supply voltage is high.

DETAILED DESCRIPTION

Figure 1:
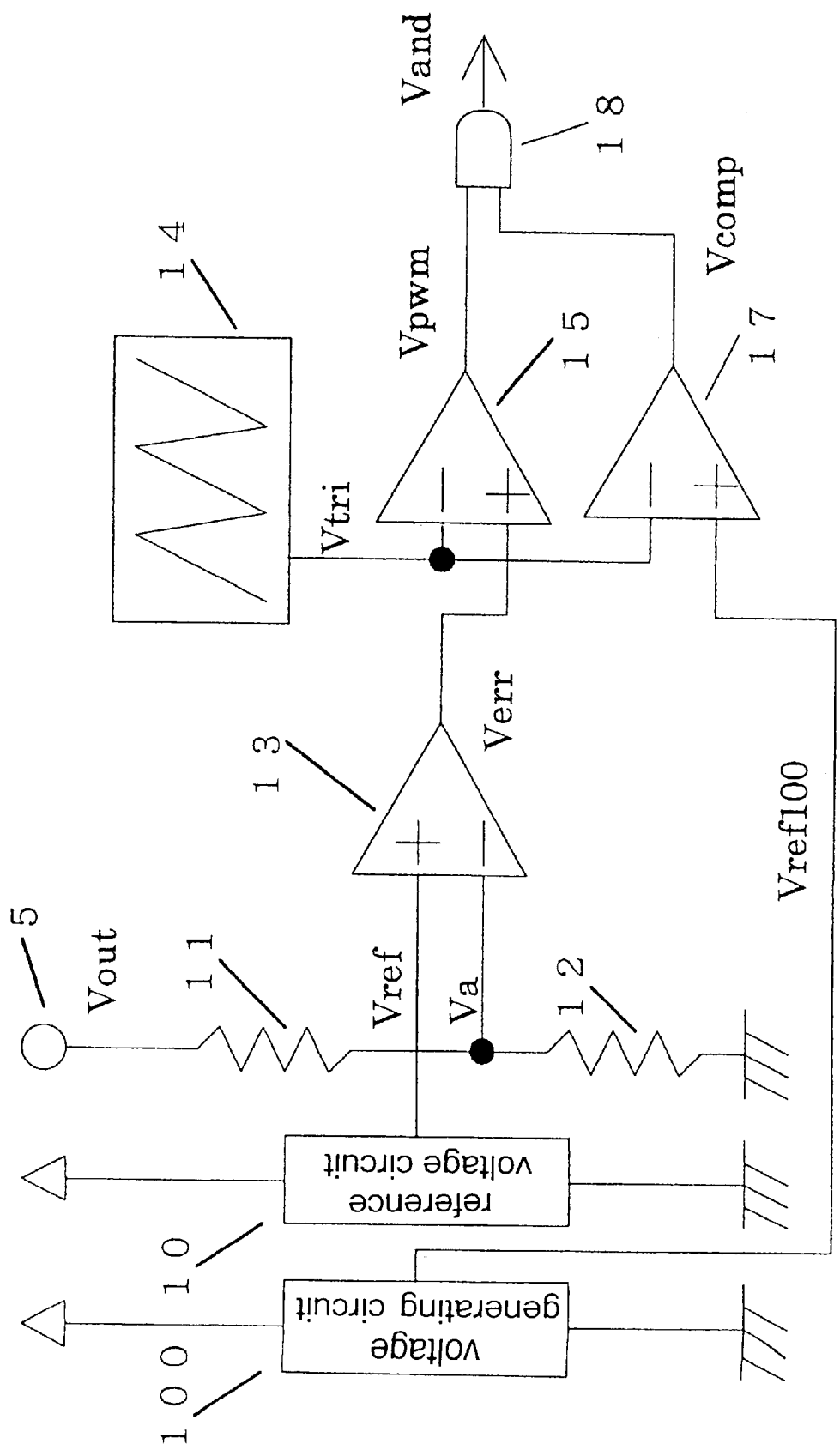
FIG. 1 is an explanatory diagram showing a SW regulator control circuit in accordance with the present invention.

Hereinafter, the present invention will be described with reference to the accompanying drawings. FIG. 1 is a diagram showing a SW regulator control circuit in accordance with an embodiment of the present invention. A reference voltage circuit 10, bleeder resistors 11, 12, an error amplifier 13, an oscillator circuit 14, a PWM comparator 15, a comparator 17 that serves as a maximum duty ratio setting circuit and an AND gate 18 are identical with those in the prior art. To a plus input terminal of the comparator 17 is inputted not a given voltage as a reference voltage but an output voltage value Vref100 of a voltage generating circuit 100.

The output voltage value Vref100 of the voltage generating circuit 100 has a power supply voltage dependency and becomes low when the power supply voltage is high, but conversely, high when the power supply voltage is low. Since the maximum duty ratio is determined by the triangular wave of the oscillator circuit 14 to the minus input of the comparator 17 and the level of the Vref100 of the plus input thereof, if the voltage of Vref100 is high, the maximum duty ratio becomes large but if the voltage of Vref100 is low, the maximum duty ratio becomes small.

Figure 2:
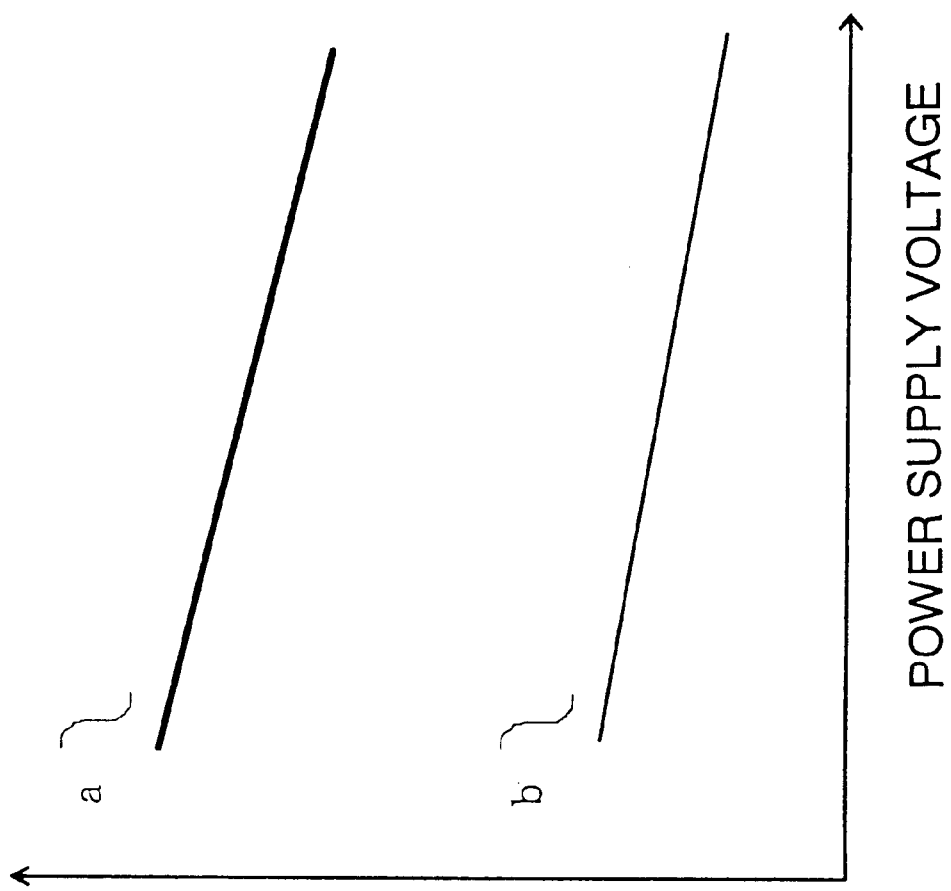
FIG. 2 is an explanatory diagram showing the operation of the SW regulator control circuit shown in FIG. 1.

That is, when the power supply voltage is high, the maximum duty ratio becomes small, whereas when the power supply voltage is low, the maximum duty ratio becomes large. This is shown in FIG. 2. A solid line a represents the maximum duty ratio, and a solid line b represents the output voltage value Vref100 of the voltage generator circuit 100. The axis of abscissa represents a power supply voltage, and as the power supply voltage is high, the value of Vref100 is lowered, and the maximum duty ratio is reduced.

In general, the maximum duty ratio of the SW regulator is typically between about 80 to 90% when not depending on the power supply voltage. However, in the present invention, when the power supply voltage is low, the maximum duty ratio becomes large to the degree of 80 to 90%, but when the power supply voltage is high, the maximum duty ratio becomes 60% or less. With this, when the power supply voltage is low, an energy is sufficiently given to the load, and when the power supply voltage is high, an energy higher than that required can be prevented from being supplied to the load.

Figure 3:
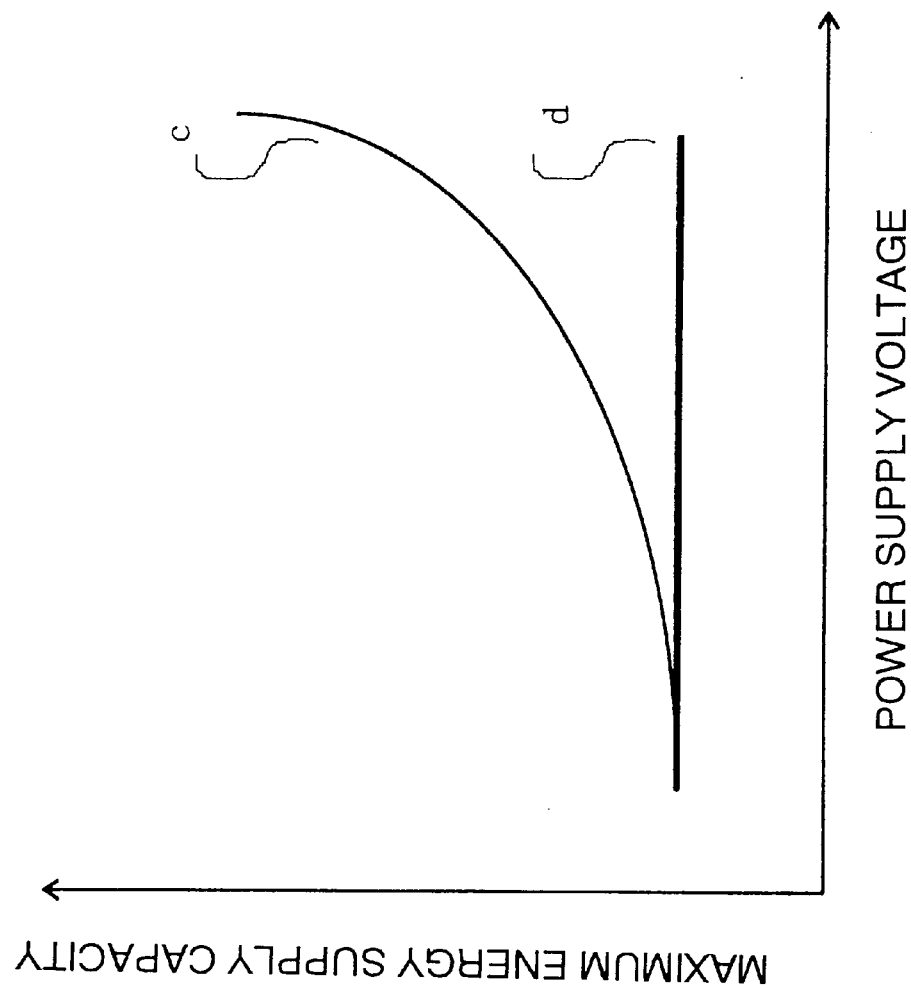
FIG. 3 is an explanatory diagram showing a power supply voltage dependency of the maximum energy supply capacity in a SW regulator according to the present invention and a conventional SW regulator.

The power supply voltage dependency of the maximum energy supply capacity to the load of the SW regulator is shown in FIG. 3 with respect to the prior art and the present invention. A solid line c represents a case of the conventional SW regulator, and a solid line d represents a case of the SW regulator according to the present invention. The axis of abscissa represents a power supply voltage, and the axis of ordinate is the energy supply capacity to the load. In the prior art, since the maximum duty ratio is constant with respect to the power supply voltage, when the power supply voltage is high, the supply capacity to the load becomes high with the result that when an abnormality such as load short-circuiting occurs, damage is caused to the power supply circuit or the switch element used in the SW regulator. On the other hand, the present invention can prevent this problem.

In the above description, the specific structure of the power supply voltage generating circuit 100 is omitted, but it is apparent that it can be structured simply with the use of an operational amplifier or the like.

Figure 4:
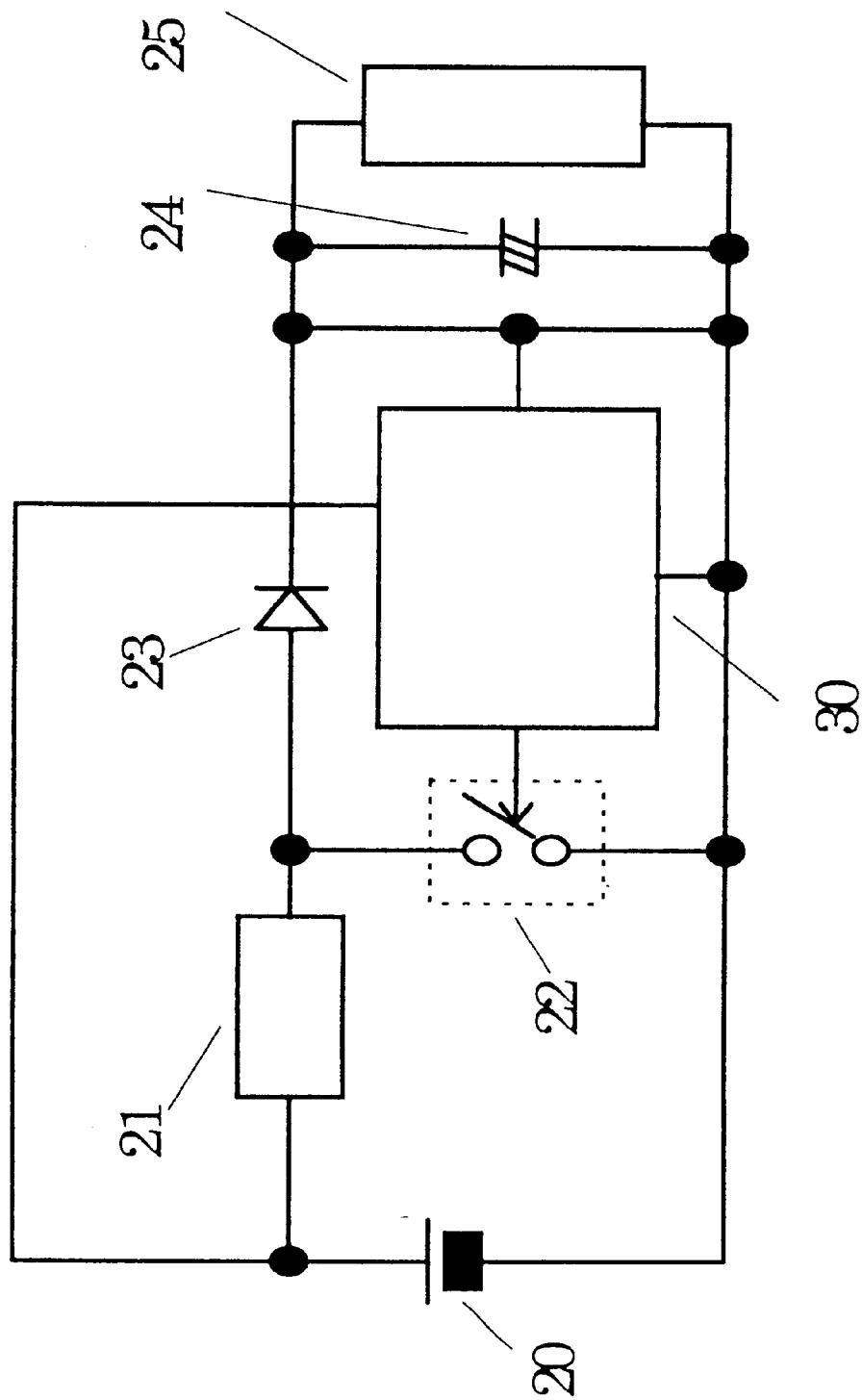
FIG. 4 is an explanatory diagram showing the structure of a boost type SW regulator in accordance with the present invention.
Figure 5:
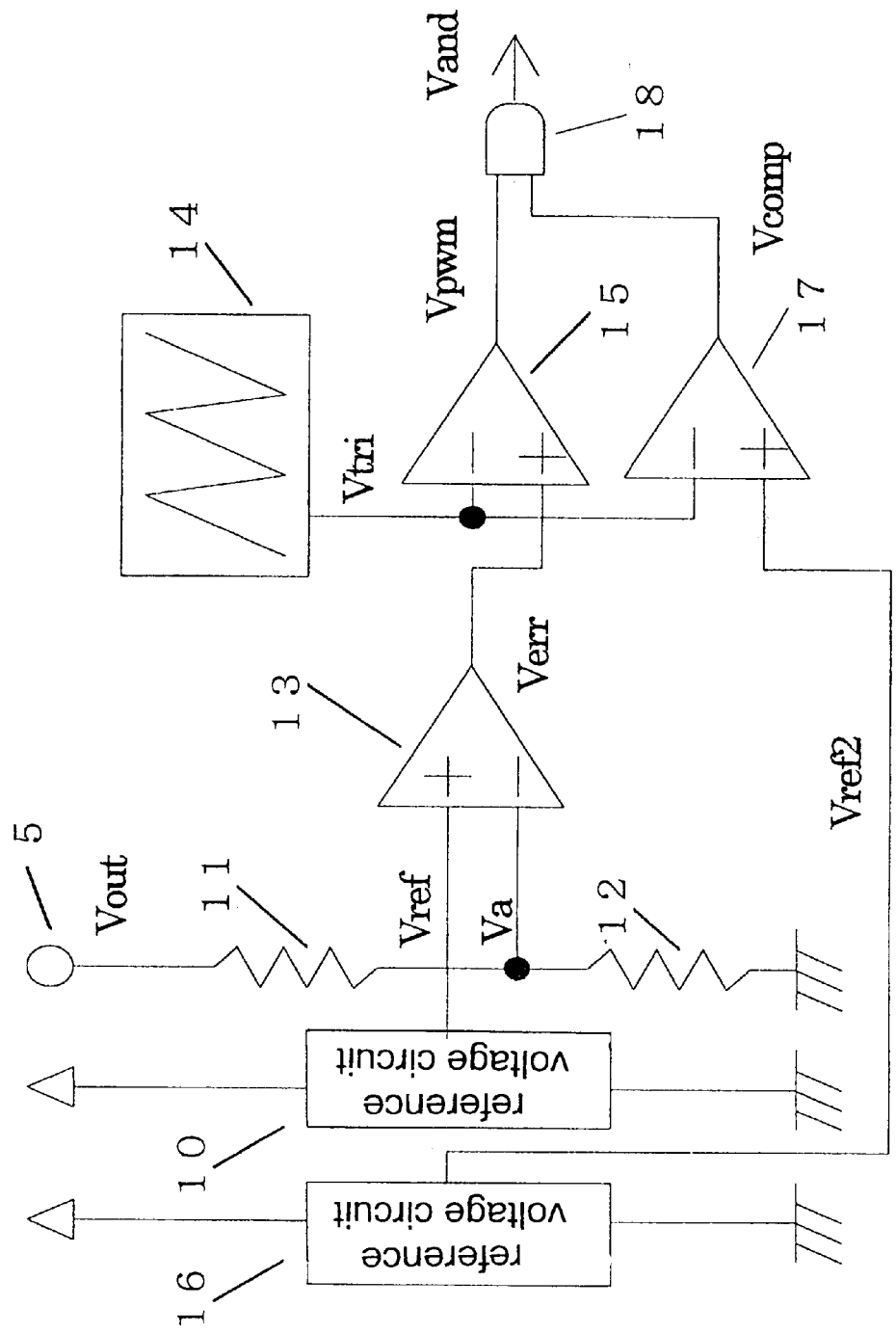
FIG. 5 is an explanatory diagram showing a conventional SW regulator control circuit.
Figure 6:
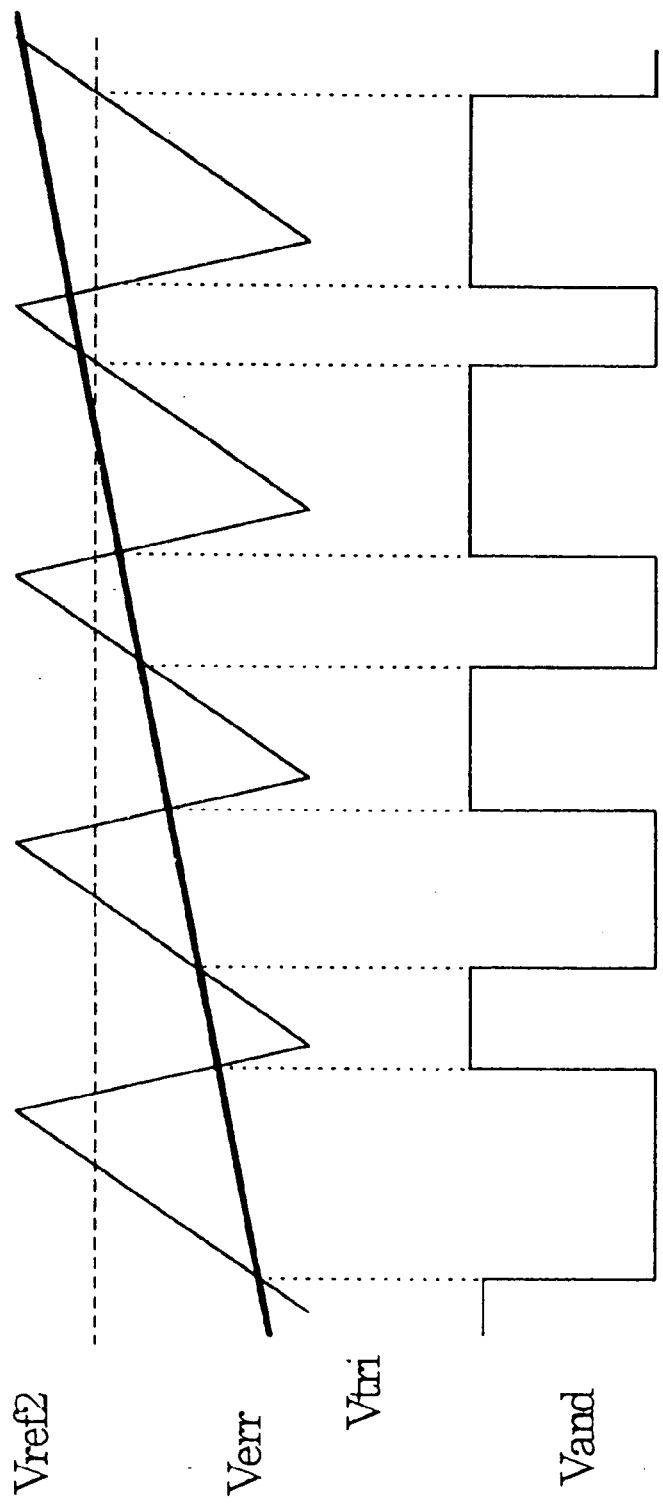
FIG. 6 is an explanatory diagram showing the operation of the SW regulator control circuit shown in FIG. 5.

FIG. 4 shows an embodiment of a SW regulator in accordance with the present invention. The SW regulator of FIG. 4 is of a boost type, and an input power supply 20 is connected with a coil 21 and a SW regulator control circuit 30 of the present invention which is shown in FIG. 1. A rectifying element 23 is connected between the coil 21 and the output capacitor 24. The load 25 is connected in parallel with the output capacitor.

In other words, the maximum duty ratio of the SW regulator control circuit 30 varies according to the power supply voltage (voltage value of the input power supply 20).

The SW regulator control circuit of according to the present invention has an advantage in that because power supply voltage dependency is imparted to the maximum duty ratio, the energy supply capacity to the load at the time of a low power supply voltage can be increased, and the supply of energy higher than that required can be suppressed at the time of a high power supply voltage, as a result of which the power supply circuit or the switch element used in the SW regulator can be prevented from being damaged by an abnormality such as load short-circuiting.

What is claimed is:

1. A switching regulator control circuit for a PWM type voltage regulator, comprising: a circuit for varying the maximum duty ratio of the PWM type voltage regulator in accordance with an input power supply voltage of the PWM type voltage regulator so that the maximum duty ratio is increased when the power supply voltage of the PWM type voltage regulator is decreased and the maximum duty ratio is decreased when the power supply voltage of the PWM type voltage regulator is increased.

2. A PWM type switching regulator having a switching regulator control circuit as claimed in claim 1.

3. A switching regulator control circuit for controlling a PWM type voltage regulator, the control circuit comprising: a reference voltage generating circuit for generating a reference voltage based upon the power supply voltage of the PWM type switching regulator; and a maximum duty ratio setting circuit for setting a maximum duty ratio of the PWM type switching regulator according to the value of the reference voltage; wherein the reference voltage varies in an inversely proportional manner with respect to the power supply voltage of the PWM switching regulator, such that an increase in the power supply voltage results in a decrease in the maximum duty ratio set by the maximum duty ratio setting circuit and a decrease in the power supply voltage of the PWM switching regulator results in an increase in the maximum duty ratio set by the maximum duty ratio setting circuit.

4. A switching regulator control circuit according to claim 3; wherein the maximum duty ratio setting circuit comprises a circuit for producing a pulse output signal having successive pulses the width of which is based upon the value of the reference voltage.

5. A switching regulator control circuit comprising: an error amplifier for producing an error signal based on a difference between a fed back portion of a regulated output voltage of a PWM type switching regulator and a first reference voltage; a first circuit for producing a pulse output signal having successive pulses the width of which is dependent upon the value of the error signal, such that the value of the regulated output voltage of the PWM type switching regulator is regulated by the first circuit; and a second circuit for producing a second pulse output signal for modulating the first periodic pulse output signal, the second pulse output signal having successive pulses the width of which is dependent upon the value of the second reference voltage so that the maximum duty cycle of the voltage regulator is dependent upon the second reference voltage; wherein the second reference voltage varies depending upon the value of a power supply voltage of the PWM type switching regulator so that the maximum duty ratio is increased when the power supply voltage decreases and the maximum duty ratio decreases when the power supply voltage increases.

6. A maximum duty ratio setting circuit for a PWM type voltage regulator, comprising: a comparison circuit for producing an output signal based on a difference between a predetermined periodic signal and a predetermined reference voltage; a reference voltage generating circuit receptive of a power supply voltage of the PWM type voltage regulator for producing the predetermined reference voltage in accordance therewith so that the predetermined reference voltage varies in an inversely proportional manner with respect to a variation in the power supply voltage; and a circuit for modulating a PWM switching signal with the output of the output signal of the comparison circuit.

7. A PWM type switching regulator having a maximum duty ratio setting circuit according to claim 6.

8. A maximum duty ratio setting circuit for a PWM type voltage regulator, comprising: a comparison circuit for producing an output signal based on a difference between a predetermined periodic signal and a predetermined reference voltage; a reference voltage generating circuit receptive of a power supply voltage of the PWM type voltage regulator for producing the predetermined reference voltage in accordance with the power supply voltage so that the predetermined reference voltage varies in an inversely proportional manner with respect to a variation in the power supply voltage; and a circuit for modulating a PWM switching signal with the output signal of the comparison circuit so that the maximum duty ratio is increased when the power supply voltage of the PWM type voltage regulator is decreased and the maximum duty ratio is decreased when the power supply voltage of the PWM type voltage regulator is increased.

9. A PWM type switching regulator having a maximum duty ratio setting circuit according to claim 8.

* * * * *